(No Model.)  
5 Sheets—Sheet 1.

B. T. CARTWRIGHT.
DOUBLE HEADED THREADING MACHINE.

No. 594,380. Patented Nov. 30, 1897.

Witnesses:  
C. M. Decker  
C. A. Rawley

Inventor  
B. Thomas Cartwright,  
By Mark M. Decker  
Attorney.

(No Model.)　　　　B. T. CARTWRIGHT.　　5 Sheets—Sheet 2.
DOUBLE HEADED THREADING MACHINE.

No. 594,380.　　　　　　　Patented Nov. 30, 1897.

WITNESSES:
C. M. Decker
C. A. Rawley

INVENTOR.
B. Thomas Cartwright,
By Mark M. Decker
ATTORNEY (No Model.) 5 Sheets—Sheet 3.
B. T. CARTWRIGHT.
DOUBLE HEADED THREADING MACHINE.
No. 594,380. Patented Nov. 30, 1897.
Fig. 3.
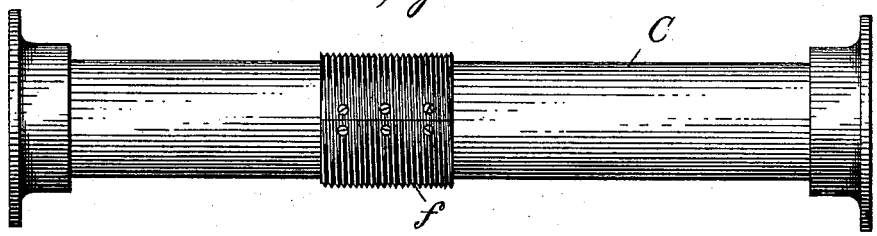
Fig. 6. Fig. 4. Fig. 7.
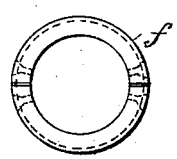 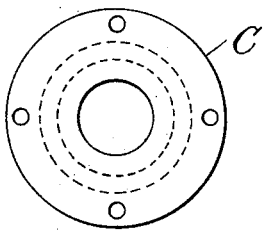 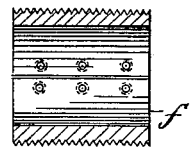
Fig. 5.
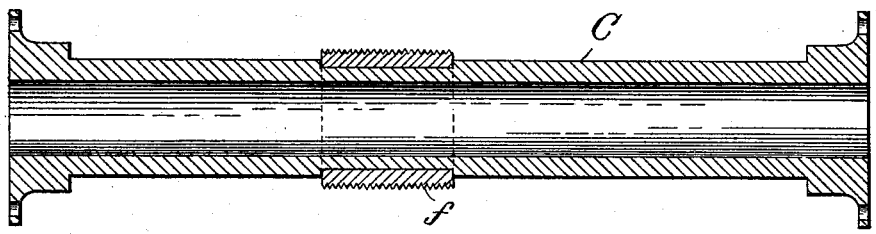
Fig. 8. Fig. 9.
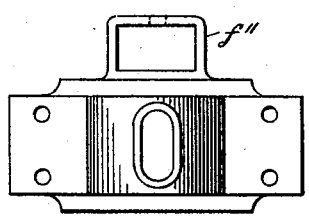 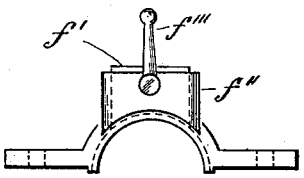
WITNESSES:
C. M. Decker.
C. A. Rawley.
INVENTOR.
B. Thomas Cartwright,
By Mark M. Decker.
Attorney.

(No Model.)  5 Sheets—Sheet 4.
B. T. CARTWRIGHT.
DOUBLE HEADED THREADING MACHINE.
No. 594,380. Patented Nov. 30, 1897.
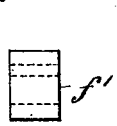
Fig. 11.
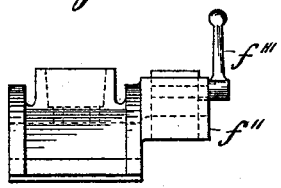
Fig. 10.
Fig. 12.
Fig. 13.
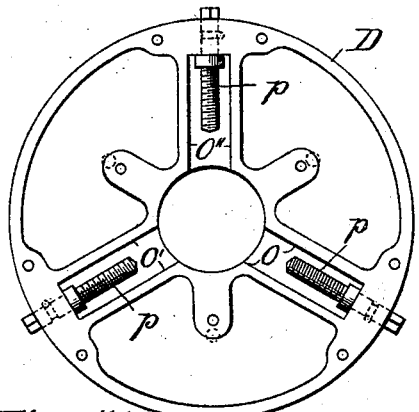
Fig. 14.
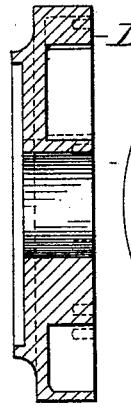
Fig. 15.
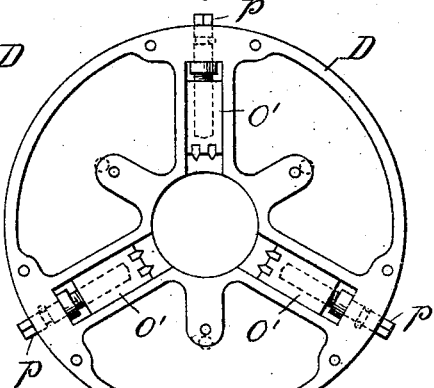
Fig. 16.
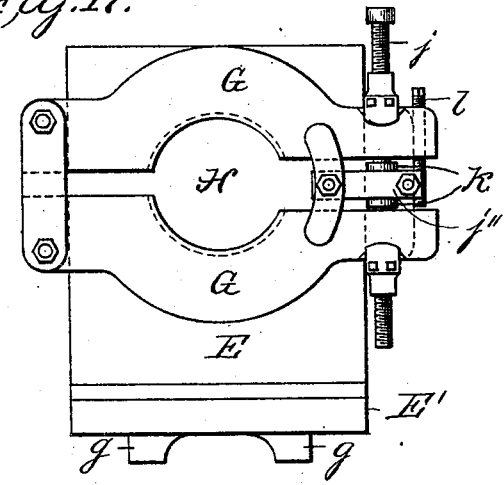
Fig. 17.
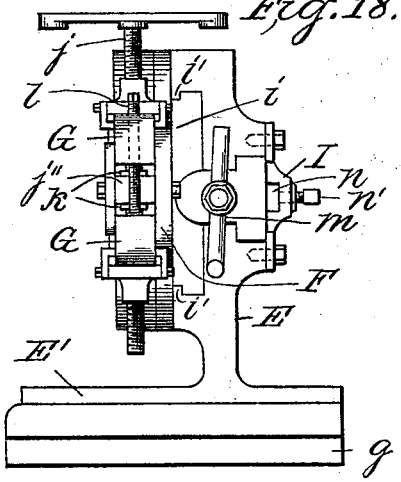
Fig. 18.
WITNESSES:
C. M. Decker
C. A. Rawley
INVENTOR.
B. Thomas Cartwright,
By Mark M. Decker.
Attorney.

(No Model.)  5 Sheets—Sheet 5.
B. T. CARTWRIGHT.
DOUBLE HEADED THREADING MACHINE.
No. 594,380.  Patented Nov. 30, 1897.
Fig. 19.
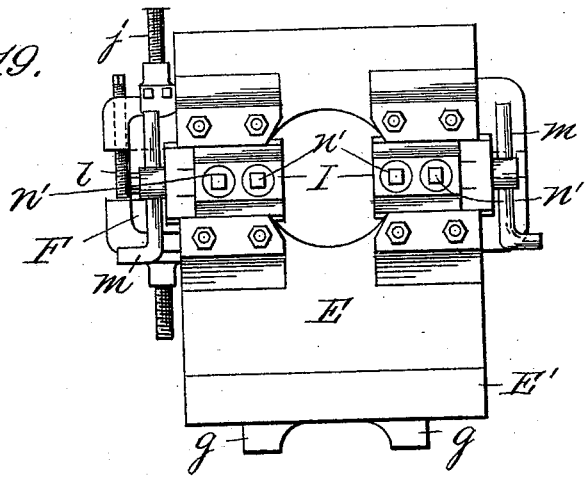
Fig. 20.
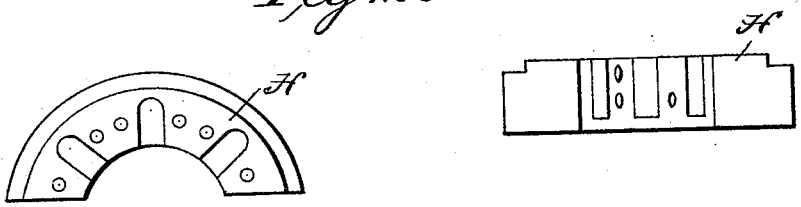
Fig. 21.
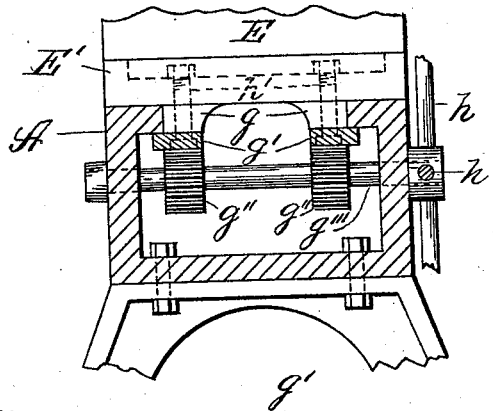
Fig. 22.
WITNESSES:
C. M. Decker.
C. A. Rawley.
INVENTOR.
B. Thomas Cartwright
By Mark M. Decker.
ATTORNEY.
THE NORRIS PETERS CO., PHOTO-LITHO., WASHINGTON, D. C.

UNITED STATES PATENT OFFICE.

BENJAMIN THOMAS CARTWRIGHT, OF WASHINGTON, PENNSYLVANIA.

DOUBLE-HEADED THREADING-MACHINE.

SPECIFICATION forming part of Letters Patent No. 594,380, dated November 30, 1897.

Application filed June 3, 1897. Serial No. 639,226. (No model.)

*To all whom it may concern:*

Be it known that I, BENJAMIN THOMAS CARTWRIGHT, a subject of the Queen of England, residing at Washington, in the county of Washington and State of Pennsylvania, have invented a new and useful Improvement in Double-Headed Threading-Machines; and I do hereby declare that the following is a full, clear, and exact description of the invention, which will enable others skilled in the art to which it appertains to make and use the same.

My invention relates to double-headed threading-machines used for cutting two consecutive or continuous threads on a pipe, tube, or other similar article of manufacture at one operation.

The objects of my invention are, first, to provide a threading-machine which will form a thread on both ends of a pipe, tube, or other similar article without removing same from the machine; second, to provide said machine with suitable cutters for simultaneously cutting the pipe or tube to the desired length; further, to so construct the machine as to be simple to manufacture and efficient in the performance of the work for which it is adapted. I attain these objects by the mechanism illustrated in the accompanying drawings, in which—

Figure 1:
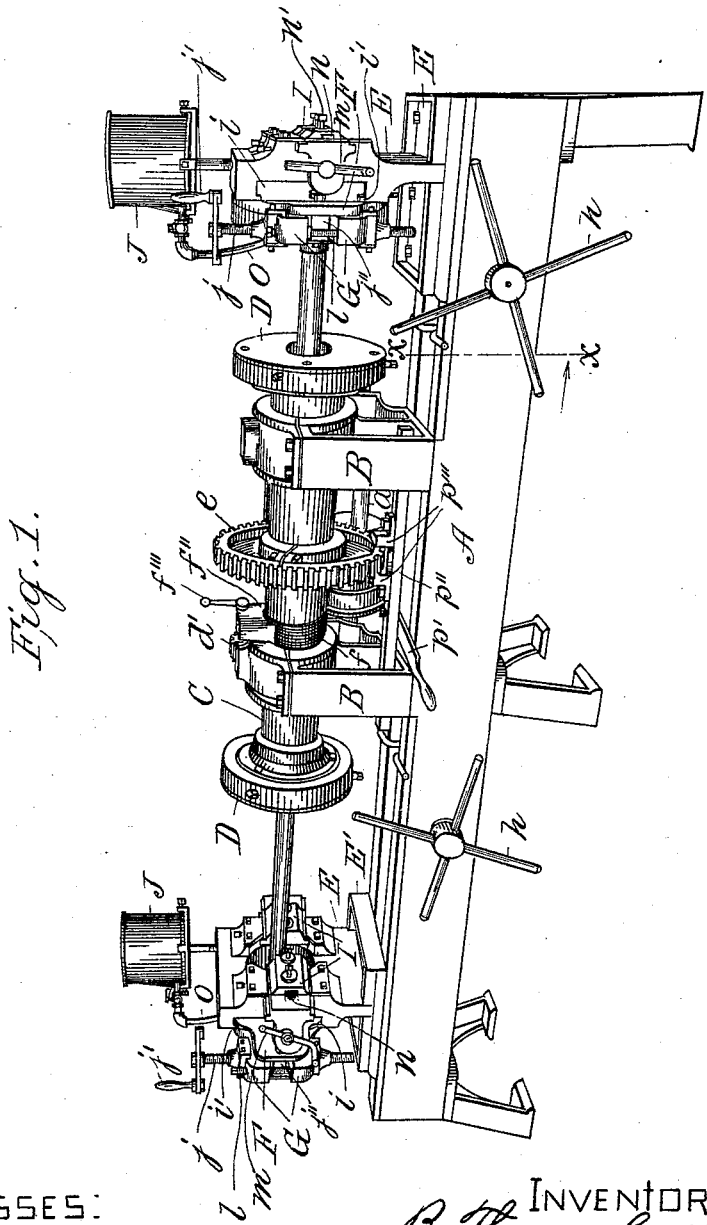
Figure 2:
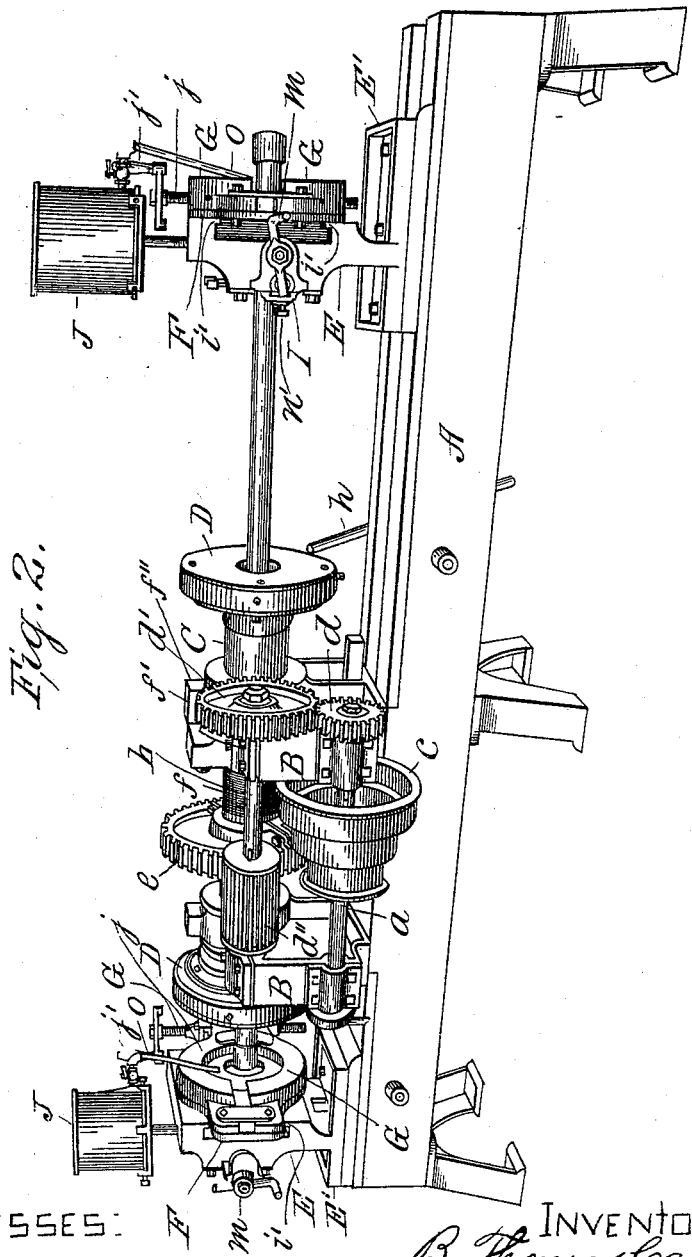

Figure 1 is a perspective view showing the front of the machine. Fig. 2 is a similar view showing the rear of the machine. Fig. 3 is a side elevation of the chuck-spindle. Fig. 4 is an end view of the same. Fig. 5 is a central longitudinal sectional view of the same. Fig. 6 is an end elevation of the threaded or feed portion of said spindle. Fig. 7 is a vertical sectional view of the same. Fig. 8 is a plan view in detail of one of the pillow-block housings, showing the top of the guard or guide for the threaded feed-block. Fig. 9 is a side elevation of the same. Fig. 10 is an end elevation of the same. Fig. 11 is an end view of the threaded feed-block. Fig. 12 is a side elevation of the same. Fig. 13 is a transverse sectional view of the guard-plate of the chuck. Fig. 14 is a plan view of the chuck with the guard-plate and grips removed. Fig. 15 is a vertical sectional view of the same. Fig. 16 is a plan view of the chuck, showing the grips in their normal position. Fig. 17 is a side elevation of the head-block or die-holder. Fig. 18 is a front elevation of the same. Fig. 19 is the reverse side elevation of the same, showing clearly the cutter-holder and the means of adjusting same. Fig. 20 represents detail views of the die-shell. Fig. 21 is a transverse sectional view of the machine-frame, taken on line $x\ x$ of Fig. 1, showing the ends of the racks and the pinions for adjusting the head-blocks or die-holder for different length pipes or tubes; and Fig. 22 is a side elevation in detail of the racks and pinions removed from the machine.

I will now describe my invention.

Similar letters indicate like parts in the several figures of the drawings.

A is the bed or frame of the machine; B, the pillow-blocks, into which are journaled the main and auxiliary power-shafts $a$ and $b$ and the chuck-spindle C. The main shaft $a$ is provided with a cone-pulley $c$ for regulating the speed of the machine and a pinion $d$, which meshes with a gear-wheel $d'$ on the end of the auxiliary shaft $b$. An elongated pinion $d''$ is keyed or otherwise secured on said shaft, which in turn meshes with a gear-wheel $e$ on the chuck-spindle C.

Chucks D, of any suitable design, are bolted or otherwise secured on the ends of the chuck-spindle, the purpose of which will appear hereinafter. A threaded portion $f$ is formed on or secured to the chuck-spindle, which engages with a corresponding threaded block $f'$, the purpose of said portion $f$ and block $f'$ being to impart a longitudinal movement to the chuck-spindle and chucks. The block $f'$ works in a guard or guide $f''$, cast on one of the housings, and is adapted to be moved vertically by means of a lever $f'''$, which works on the principle of a cam or eccentric. The pivot of said lever enters a hole in the side of the guard, as shown in Figs. 9 and 10, and passes through the feed-block. The hole in the feed-block is elongated, as shown in Fig. 12, to allow for the cam movement, the object of the vertical movement being to lift the block out of engagement with the threaded portion $f$, so that the chuck-spindle can be returned to its normal position after each operation, as will be more fully described hereinafter.

The head-blocks or die-holders E are formed with bases E', which rest on the top of the bed or frame of the machine and are provided with two downwardly-projecting flanges $g$ on the under side. Two racks $g'$ are bolted to said flanges with the cog-surface down and mesh with pinions $g''$ on a shaft $g'''$. The outer end of said shaft projects through the side of the frame and is provided with handles $h$ for turning same, the purpose of said racks and pinions being to move the said head-block or die-holder to or from the chucks D, as different length tubes or pipes may require.

The bolts $h'$, which secure the racks $g'$ to the head-blocks, also act as a tension to hold said blocks in a rigid position after they have been adjusted for a given length.

A die carrier or plate F works in a recess $i$ in the head-block and is held in position by flanges $i'$. Pivotally secured to said plate F are the jaws G, into which is secured the die-shell H, which contains the dies for cutting the threads. The jaws G open and close by means of a screw $j$, which is operated by a handle $j'$, secured to the top thereof. The screw $j$ works in a guide-block $j''$ and is prevented from moving up or down by collars $k$. The said screw is provided at one end with a right-hand thread and at the other with a left-hand thread, as will be seen, for opening both jaws by the one movement. The screw $j$ does not work directly in the jaws G, but screw into a brass which is secured on said jaws, and has a slight rocking movement caused by the opening and closing of the jaws. A tension or limit screw $l$ is placed in the ends of the jaws to prevent them from closing too closely and determining and retaining the proper size of threads.

Suitable cutter-holders I are provided on the opposite side of the head-blocks for cutting the pipes or tubes to the desired length, the construction of which is as follows: The cutter-holder proper works in a slide and is operated by a hand-screw $m$, which screws into the head-block and moves the holder, together with the cutter, into or from the pipe or tube. The cutters (not shown) are secured in the slot $n$ by means of the screw-bolts $n'$.

Oil-tanks or reservoirs J are screwed to the tops of the head-blocks and small pipes $o$ convey oil to the dies, as on all ordinary thread-cutting machinery.

I will now describe the construction of the chucks, as shown in the drawings. The body of the chuck is as shown in Figs. 14, 15, and 16. The grips $o'$ work in the slides $o''$ and are moved in and out of contact with the pipe or tube by the adjusting-screws $p$. The outer ends of the grips are provided with jaws which grasp the article upon which the thread is to be cut and holds it firmly, thus preventing it from turning independently of the chucks. The chucks are secured to the ends of the chuck-spindle C by means of bolts, screws, or in any other suitable manner. The chuck-spindle is hollow, as shown in Figs. 4 and 5, to allow a pipe or tube to be passed through from one die to the other. A lever $p'$ is pivoted to one side of the machine-frame and also is pivoted to a slide $p''$, which has on its upper side a piece of metal having two upwardly-projecting lugs $p'''$, which embrace the gear-wheel $e$ on the chuck-spindle, the purpose of said lever $p'$ and slide $p''$ being to return the chucks and chuck-spindle to their normal position after each operation of cutting the threads on a pipe, tube, or other article.

The operation of my invention is as follows: The head-blocks or die-holders being adjusted for a given length of pipe, the jaws being in their open position and the chucks standing in the position shown in Fig. 1, the machine is ready to perform the operation of cutting the threads. A pipe or tube is introduced from the left-hand end of the machine through the head-block and chuck-spindle and centered in the chucks. The jaws which contain the die-shells and dies are then screwed down or together, which brings the dies in contact with the ends of the pipe or tube. The lever $f'''$ is then thrown down and the machine started. The pipe or tube is fed into the dies by means of the threaded portion $f$ and feed-block $f'$, which are provided with threads corresponding to those of the dies. After the threads have been cut back far enough on the pipe the lever $f'''$ is lifted up and the jaws opened by the screws $j$. The chucks and chuck-spindle are moved back to the left by the lever $p'$ and slide $p''$. The chucks are then released and the pipe or tube removed. If a pipe is too long, it is pushed up to the cutters by the lever $p$ and cut off to the desired length.

Having described my invention, what I claim is—

1. A double-headed thread-cutting machine, comprising a bed or frame, on which are secured pillow-blocks into which are journaled a main and auxiliary power-shaft and chuck-spindle, each of which are geared with the other by suitable pinions and gear-wheels, said chuck-spindle being provided at both ends with chucks for holding and feeding the article to be threaded into the dies, substantially as shown and described.

2. A double-headed thread-cutting machine, comprising a bed or frame, on which are secured pillow-blocks into which are journaled a main and auxiliary power-shaft and chuck-spindle, a guide cast on the side of one of the pillow-blocks which contains a block provided on its under side with threads said block being adapted to mesh with the threaded portion which is formed on or secured to the chuck-spindle for imparting a longitudinal movement thereto for feeding the article to be threaded into the dies, substantially as shown and described.

3. A double-headed thread-cutting machine, comprising a bed or frame, on which are movably secured die-holders, said holders being adapted to be moved laterally on said bed or frame for bringing the dies proper into engagement with the article to be threaded, together with suitable cutters secured on one side of said die-holders for cutting the article to the desired length, all substantially as shown and for the purposes described.

4. A double-headed thread-cutting machine for cutting two consecutive and continuous threads on both ends of the article at one operation, comprising a bed or frame, pillow-blocks secured on said frame into which are journaled a main and auxiliary power-shaft and chuck-spindle, said spindle being provided with a rotary and longitudinal movement, die-holders movably secured on the bed of the machine for containing the dies, a threaded portion formed on or secured to the chuck-spindle, together with a guide on the side of one of the pillow-blocks which contains a vertically-movable block which is threaded on its under side and adapted to mesh with the threaded portion of the chuck-spindle for feeding the article to be threaded into the dies, substantially as shown and described.

B. THOMAS CARTWRIGHT.

Witnesses:
BOYD E. WARNE,
C. M. DECKER.